April 6, 1954  L. J. KMIECIK ET AL  2,674,475
FLOAT BLOCKING PLUG ASSEMBLY
Filed Oct. 13, 1951
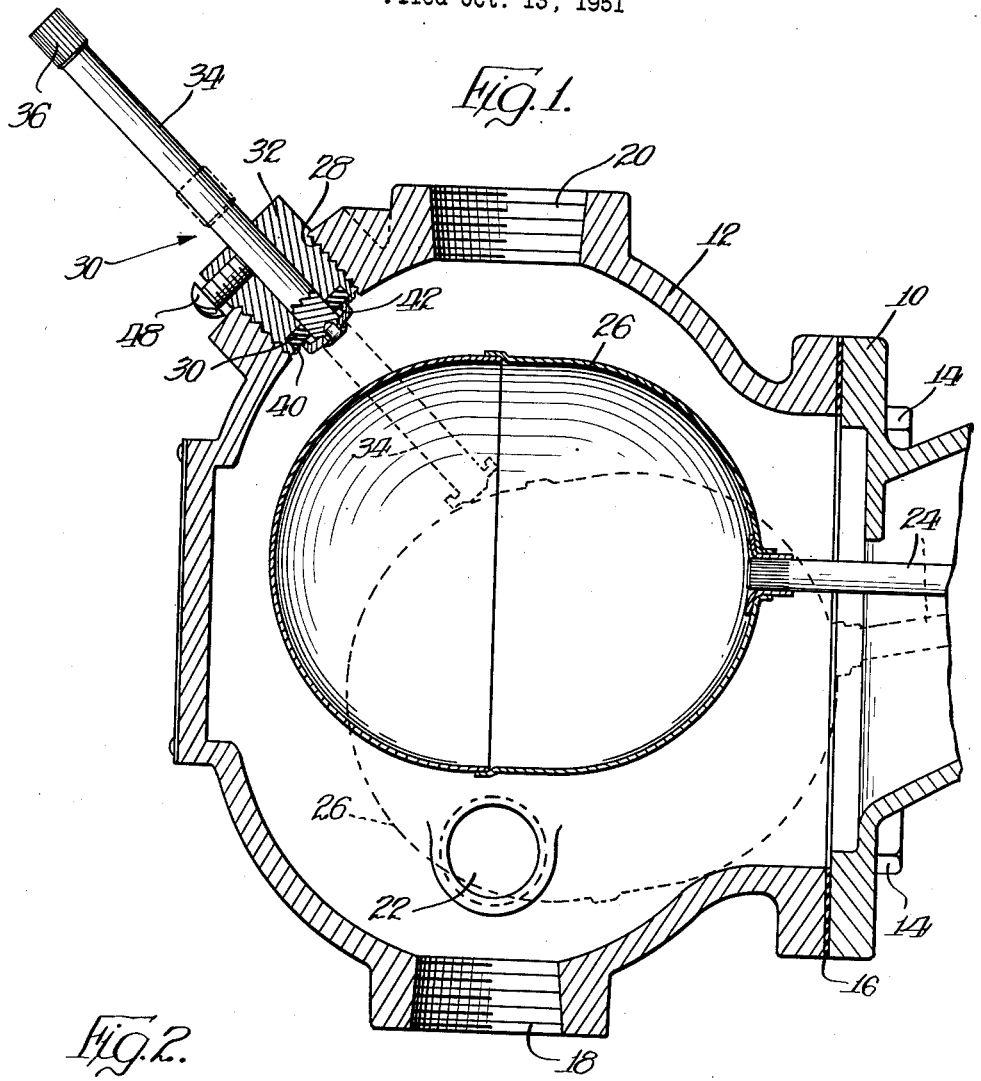
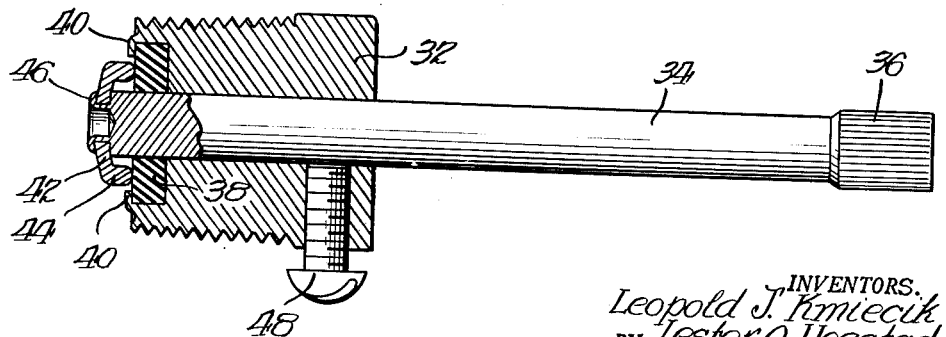
INVENTORS.
Leopold J. Kmiecik
BY Lester O. Hegstad Patented Apr. 6, 1954

2,674,475

UNITED STATES PATENT OFFICE 2,674,475

FLOAT BLOCKING PLUG ASSEMBLY

Leopold J. Kmiecik and Lester O. Hegstad, Chicago, Ill., assignors to McDonnell & Miller, Inc., Chicago, Ill., a corporation of Delaware Application October 13, 1951, Serial No. 251,224

2 Claims. (Cl. 286—36)

The present invention relates to liquid level responsive devices and particularly to a plug assembly adapted to restrain movement of the float member of such devices to prevent damage thereto.

Frequently, liquid level responsive devices are portable, or are associated with portable apparatus, such as portable boilers, which are inoperative during transportation. Since the devices are inoperative, the liquid is normally drained from the apparatus during transportation so that the float ball or liquid level responsive element of the device has complete freedom of movement. Jarring and impact imparted to the apparatus during transportation results in movement of the float ball or liquid level responsive element so that same may readily become damaged by forcible bodily contact with the walls of the chamber within which the float is positioned. Due to their construction, floats frequently are damaged and lose their liquid level responsive characteristics by such forcible contact, thus rendering the control means actuated by the float inoperative. Failure of the control means may result in serious damage to the apparatus and injury to personnel operating same.

An object of the present invention is to provide a plug assembly adapted for use with liquid level responsive devices to block or restrain movement of the float during transportation of the device to prevent movement of the float and, consequently, to prevent damage thereto.

Another object of the present invention is the provision of a plug assembly adapted for permanent association with a liquid level responsive device and having a movable member adapted for engagement with the float of the device to prevent movement thereof during transportation and adapted for disengagement from the float to release same and accommodate free movement thereof during operation of the device in response to variations in liquid level in the device.

A further object of the invention is to provide a plug assembly having a movable member adapted for cooperation with the float of a liquid level responsive device, the movable member extending to the exterior of the device for free access and manipulation and having means associated therewith for sealing the movable member to prevent leakage past same.

Other objects and advantages of the present invention will become apparent from the following detailed description of a preferred embodiment of the invention, wherein reference is made to the accompanying drawings, in which:

Figure 1 is a partial vertical section of a liquid level responsive device, showing the plug assembly of the present invention associated therewith; and Figure 2 is a cross-sectional view of the plug assembly of the present invention on an enlarged scale.

Referring now to the drawings, the present invention is shown as associated with a liquid level responsive device comprising a first body member 10 secured to a second body member 12 by means of a plurality of bolts 14. A suitable gasket 16 may be positioned between the body members 10 and 12 to provide a seal therebetween. The second body member 12 defines a float chamber having a fluid inlet 18 and a fluid outlet 20. The second body member 12 is also provided with a conventional cleanout plug 22 facilitating the inspection and cleaning of the float chamber. The body 10 of the liquid level responsive device may suitably support a valve, switch, or alarm, in a customary manner, the valve, switch, or alarm being operatively associated with an actuator rod 24 for actuation thereby in response to variations in liquid level in the float chamber defined by the body member 12. The actuator rod 24 is suitably knurled at its outer end for positive securement to one section of a float ball 26.

The float ball 26 is of conventional design and consists of a pair of substantially semi-spherical sections which are preferably formed of brass and suitably brazed together in a conventional and known manner. The float ball 26 is normally free to move within wide limits, as is indicated by the dotted line representation in Figure 1, to respond to variations in liquid level within the float chamber. However, should one consider the device as being drained of liquid and being transported from one place to another, the float ball 26 is normally free to move without restriction in the float chamber so that same may be moved with substantial impact against the walls of the body member 12 defining the float chamber. Such bodily contact with the walls of the body member 12 may produce dents, splits, or cuts in the walls of the float ball 26. Dents in the surface of the float ball will result in a variation in displacement thereof upon the occurrence of a predetermined liquid level in the float chamber so that the apparatus actuated by or responsive to movements of the ball will not be actuated in accordance with the desired features of the device and will result in improper control of the apparatus. A split or cut in the walls of the float 26 will accommodate entry of liquid to the interior of the ball with the result that the ball will not follow variations in liquid level in the float chamber and the control means actuated thereby will be rendered entirely inoperative. Accordingly, it will be appreciated that movement of the float ball during transportation of the liquid level responsive device is not desirable.

To prevent movement of the float ball of the liquid level responsive device during transportation thereof, the body member 12 of the device is provided with a threaded bore 28 adapted for the reception of the plug assembly of the present invention, indicated generally at 30. The plug assembly 30 of the present invention comprises a cylindrical plug 32 provided on its peripheral surface with a screw or pipe thread adapted for cooperation with the thread of the bore 28 for sealing engagement within the bore 28. The cylindrical plug is provided with an axial bore adapted for the reception of a blocking rod 34. The blocking rod 34 is elongate and is adapted for movement from a position outside of the path of movement of the float ball 26 into engagement with the float ball, to move the float ball downwardly into engagement with one wall of the body member 12 and to retain the ball against that wall so as to restrain movement thereof during transportation of the device. Accordingly, the rod 34 must be of such length as to accomplish the function defined. When the blocking rod is moved to the position shown in dotted lines, it will hold the float in engagement with one wall of the body member 12 to prevent movement of the float so that same cannot be jarred or moved against the walls of the float chamber with sufficient impact to cause damage thereto. Accordingly, the plug assembly of the present invention prevents injury or damage to the float ball or liquid responsive element of the liquid level responsive device with which associated.

The blocking rod 34 is preferably provided with a knurled head 36 adapted for the reception of a suitable actuating knob or to provide a surface that can be readily grasped by an operator. To prevent leakage of liquid from the float chamber past the blocking assembly of the present invention, the blocking assembly is provided with a suitable seal. To this end, the cylindrical plug 32 is provided at one end with an axial counterbore adapted for the reception of an annular sealing member 38. The annular sealing member 38 is preferably formed of resilient material and is provided with an axial bore of such size that the seal 38 sealingly engages the peripheral surface of the blocking rod 34. To secure the seal 38 in the counterbore in the cylindrical plug 32, the cylindrical plug is formed with a reduced end portion within which the counterbore is formed so as to provide an axially extending concentric ring of material adapted to be bent over, as at 40, to retain the seal 38 in the counterbore.

While sufficient sealing action may be provided by the annular seal 38 engaging the peripheral surfaces of the blocking rod 34, it is preferable that the blocking rod 34 be provided with a head 42 adapted for sealing cooperation with the seal 38. The head 42 on the rod 34 is preferably cup-shaped so as to present an annular rim 44 adapted to engage the seal 38 and to seal about the peripheral portions of the rod 34. The head 42 may be secured to the rod 34 in any conventional manner, but it is preferred that the rod 34 be formed with a reduced end portion and an axial bore in the reduced end portion. The cup-shaped head 42 is provided with a central aperture adapted for the reception of the reduced end portion of the rod 34 and is adapted to be moved over the reduced end portion into engagement with the shoulder on the rod 34 formed by the reduced end portion. The reduced end portion of the rod is preferably of a length greater than the thickness of the head 42 so that portions of the rod extending beyond the head may be suitably peened over, as at 46, into engagement with the head to secure the head to the rod 34.

Sufficient resistance to movement may be provided by the engagement of the seal 38 with the peripheral wall of the rod 34 to restrain movement of the rod 34 and of the float ball 26 when the rod 34 is moved into engagement therewith. However, it is preferred that suitable locking means be provided to secure the blocking rod 34 in its position of engagement with the float ball 26 or in its position out of the path of movement of the ball 26. Accordingly, the cylindrical plug 32 is provided with a transverse or radial bore extending from the exterior of the plug into the axial bore and threaded for the reception of a set screw 48. The set screw 48 is adapted to be adjusted within the threaded radial bore in the plug 32 for engagement with the blocking rod 34 to retain the rod in any adjusted position within the plug 32.

From the foregoing it will be appreciated that the present invention provides a plug assembly adapted for cooperation with a liquid level responsive device to restrain the float member of the device against movement so as to prevent damage to the float during transportation of the device. The plug assembly of the present invention is adapted to be permanently associated with the liquid level responsive device and has the blocking rod thereof extending to the exterior of the device so as to be conveniently and readily manipulated or moved to restrain the float of the device against movement or to move the blocking rod out of the path of movement of the float to accommodate free movement of the float in respnse to variations in liquid level within the device. A perusal of the accompanying drawings will clearly indicate that the plug assembly of the present invention is of convenient and extremely economical manufacture so that same may be readily incorporated in any and all liquid level responsive devices without substantial increase in the cost of the device to the ultimate user.

While we have described what we regard to be a preferred embodiment of our invention, it will be apparent that various changes, rearrangements and modifications may be made therein without departing from the scope of the invention, as defined by the appended claims.

We claim:

1. A float blocking plug assembly comprising a cylindrical plug having an external thread and axial bore, an elongate cylindrical blocking rod slidably received in the axial bore in said plug, said plug having an axial counterbore, an annular seal received in said counterbore and engaging the periphery of said rod, portions of said plug adjacent said counterbore being peened over to secure said seal in said counterbore, said rod having a head thereon adapted to cooperate with said seal, said rod having a reduced end portion for the reception of said head and having portions thereof peened over to secure said head.

thereon, said head being cup-shaped and having an annular rim adapted to engage said seal, said plug having a threaded radial bore therein extending from the periphery to the axial bore of said plug, and a set screw threaded in said radial bore and adapted to engage said rod to lock said rod in any one of a plurality of positions with respect to said plug.

2. A float blocking plug assembly comprising a cylindrical plug having an axial bore, an elongate cylindrical blocking rod slidably received in the axial bore in said plug, said plug having an axial counterbore, an annular seal secured in said counterbore and having a bore therethrough aligned with said axial bore in said plug and engaging the periphery of said rod to provide a seal about the latter, a head secured to the end of said rod, said head being cup-shaped and having an annular rim adapted to engage said seal, and locking means threaded through said plug adapted to engage said rod to lock the latter in any one of a plurality of positions with respect to said plug.

References Cited in the file of this patent

UNITED STATES PATENTS

| Number | Name | Date |
|---|---|---|
| 371,075 | Klein | Oct. 4, 1887 |
| 898,255 | O'Brien | Sept. 8, 1908 |
| 1,165,676 | Kenmir | Dec. 28, 1915 |
| 1,453,324 | Purtle | May 1, 1923 |
| 1,675,979 | Laird | July 3, 1928 |
| 2,015,158 | Rosenburg | Sept. 24, 1935 |
| 2,091,874 | Neuhaus | Aug. 31, 1937 |
| 2,112,548 | Wilson | Mar. 29, 1938 |
| 2,285,324 | Bennett | June 2, 1942 |
| 2,336,924 | Cordis | Dec. 14, 1943 |
| 2,521,659 | Wendell | Sept. 5, 1950 |

FOREIGN PATENTS

| Number | Country | Date |
|---|---|---|
| 534,973 | France | 1922 |